United States Patent [19]
Harfmann

[11] Patent Number: 5,681,865
[45] Date of Patent: Oct. 28, 1997

[54] METHOD FOR PRODUCING POLYESTER FOAM

[75] Inventor: Walter R. Harfmann, Matthews, N.C.

[73] Assignee: Genpak Corporation, Glens Falls, N.Y.

[21] Appl. No.: 743,959

[22] Filed: Nov. 5, 1996

[51] Int. Cl.$^6$ ....................................................... C08J 9/14
[52] U.S. Cl. ............................... 521/79; 521/98; 521/182
[58] Field of Search ................................ 521/98, 79, 182

[56] References Cited

U.S. PATENT DOCUMENTS

| | | | |
|---|---|---|---|
| 4,043,950 | 8/1977 | Wilmsen et al. | 260/2.5 F |
| 4,833,174 | 5/1989 | Tung | 521/81 |
| 4,981,631 | 1/1991 | Cheung et al. | 264/50 |
| 5,000,991 | 3/1991 | Hayashi et al. | 428/36.5 |
| 5,110,844 | 5/1992 | Hayashi et al. | 521/182 |
| 5,128,383 | 7/1992 | Amano et al. | 521/182 |
| 5,223,545 | 6/1993 | Kumar | 521/51 |
| 5,229,432 | 7/1993 | Muschiatti | 521/182 |
| 5,234,640 | 8/1993 | Amano et al. | 264/55 |
| 5,246,976 | 9/1993 | Pontiff | 521/143 |
| 5,254,400 | 10/1993 | Bonner, Jr. et al. | 428/305.5 |
| 5,314,925 | 5/1994 | Burnell et al. | 521/92 |
| 5,340,846 | 8/1994 | Rotter et al. | 521/182 |
| 5,360,829 | 11/1994 | Kawabe et al. | 521/81 |
| 5,391,582 | 2/1995 | Muschiatti et al. | 521/81 |
| 5,399,595 | 3/1995 | Sublett et al. | 521/182 |
| 5,422,381 | 6/1995 | Al Ghatta et al. | 521/182 |

*Primary Examiner*—Morton Foelak
*Attorney, Agent, or Firm*—Heslin & Rothenberg, P.C.; Wayne F. Reinke, Esq.

[57] ABSTRACT

Low density PET foam is extruded by heating PET resin above the crystalline melt point to melt the resin, combining Heptane as the blowing agent with the PET resin to create a mixture, cooling the mixture to a temperature of less than 538° K., and extruding the foam through a die. The Heptane is about 0.5–5% by weight of the mixture, and preferably about 1–3%.

7 Claims, 5 Drawing Sheets fig. 1 fig. 2 fig. 3 fig. 4 fig. 5 fig. 6

METHOD FOR PRODUCING POLYESTER FOAM

BACKGROUND OF THE INVENTION

1. Technical Field

The present invention generally relates to a method for producing polyester foam by extrusion. More particularly, the present invention relates to a method for producing low density polyester foam by extrusion.

2. Background Information

For some time, low density polystyrene foam has been found useful in insulation, packaging, beverage cups and food containers. However, polystyrene foam and the extrusion process for making it have been associated with undesirable environmental concerns, regardless of whether those concerns have their origin in fact. In addition, polystyrene products generally have a service temperature limit of about 366.3° K. Above the service temperature limit, the product will warp and distort. Therefore, there is a general desire for other types of low density foam that are not associated with such concerns.

Polyester resins, such as poly(ethylene terephthalate) (often referred to as "PET"), exist that could be used without such associated concerns. PET is currently widely used to make many recyclable plastic items, such as soda bottles. However, attempts to produce a low density PET foam have been less than entirely successful. The PET foams extruded using single traditional blowing agents, such as, for example, carbon dioxide, chloro-difloro-methane and butane, have experienced foam cell collapse and/or severe corrugation. Thus, the quality of the PET foams produced has not been close to polystyrene. The collapsing problem is due to the fact that the foaming temperature for PET is about 516° K., which results in a high rate of expansion for the traditional blowing agents, causing cell wall rupture and allowing the gas to escape. Without gas in the PET foam cells prior to cooling, the cells cannot support themselves. In addition, PET resins generally have an inferior melt strength compared to polystyrene resins. As one skilled in the art will know, melt strength refers to the ability of a material to be stretched at its melting temperature without breaking. The combination of a lower melt strength and higher vapor pressure at the PET foaming temperature also requires a reduction in the size of the extrusion die opening where the foam exits. Such small die openings lead to a thin gauge foam sheet experiencing severe corrugation at low densities.

In addition to the above-noted problems, various blowing agents have not been approved by the U.S. Food and Drug Administration for use in making high temperature food containers, due to toxicity problems and/or environmental concerns. This complicates the attempt to find an approved blowing agent that will work with polyester resins.

Thus, a need exists for a way to make a quality low density polyester foam approaching or achieving the quality of polystyrene foam using an approved blowing agent.

SUMMARY OF THE INVENTION

Briefly, the present invention satisfies the need for a quality low-density polyester foam using an approved blowing agent by proposing Heptane as the blowing agent, providing the plastization, volumetric expansion and vapor pressure needed to prevent foam cell collapse during cooling.

In accordance with the above, it is an object of the present invention to provide a method for producing polyester foam by extrusion.

It is another object of the present invention to provide a method for producing low-density polyester foam.

It is still another object of the present invention to provide a method for producing low-density, substantially uniform closed cell polyester foam.

It is yet another object of the present invention to provide a method for producing low-density, substantially uniform closed cell polyester foam with a surface that is substantially smooth to the touch.

The present invention provides a method for producing a substantially uniform closed cell foam of density less than 0.40 g/cm$^3$ from a polyester resin by extrusion through a die at a foaming temperature. The method comprises steps of heating the polyester resin to a temperature such that it melts, combining Heptane as the blowing agent with the polyester resin to create a mixture, cooling the mixture to a temperature of less than 538° K., and extruding the foam from the die.

These, and other objects, features and advantages of this invention will become apparent from the following detailed description of the various aspects of the invention taken in conjunction with the accompanying drawings.

BEST MODE FOR CARRYING OUT THE INVENTION

Figure 1:
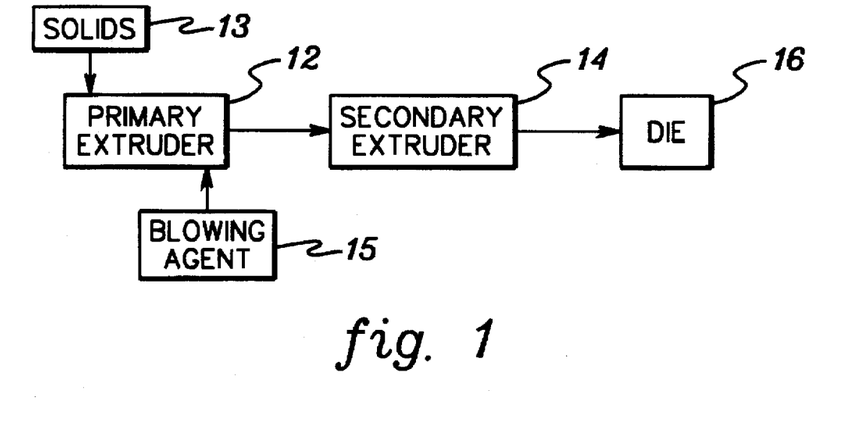
FIG. 1 is a block diagram of the major components of an extrusion system useful with the present invention.
Figure 2:
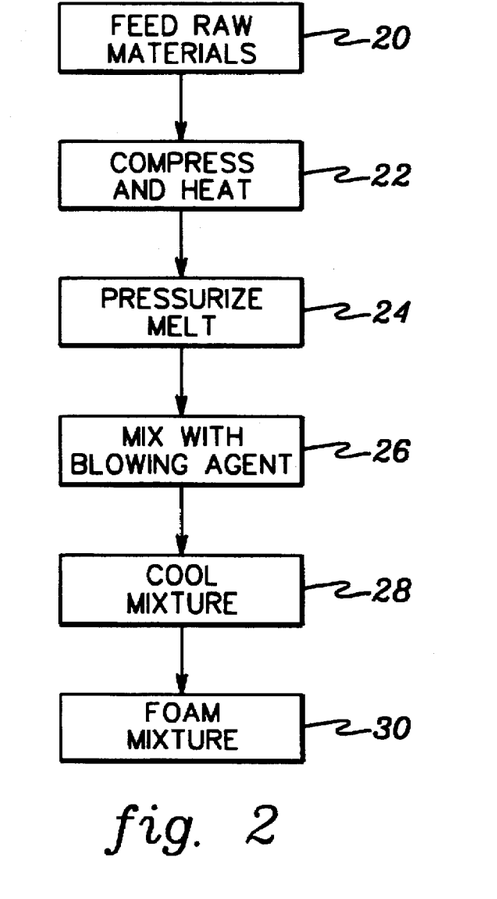
FIG. 2 is a flow diagram for a general extrusion process with reference to the system of FIG. 1.
Figure 3:
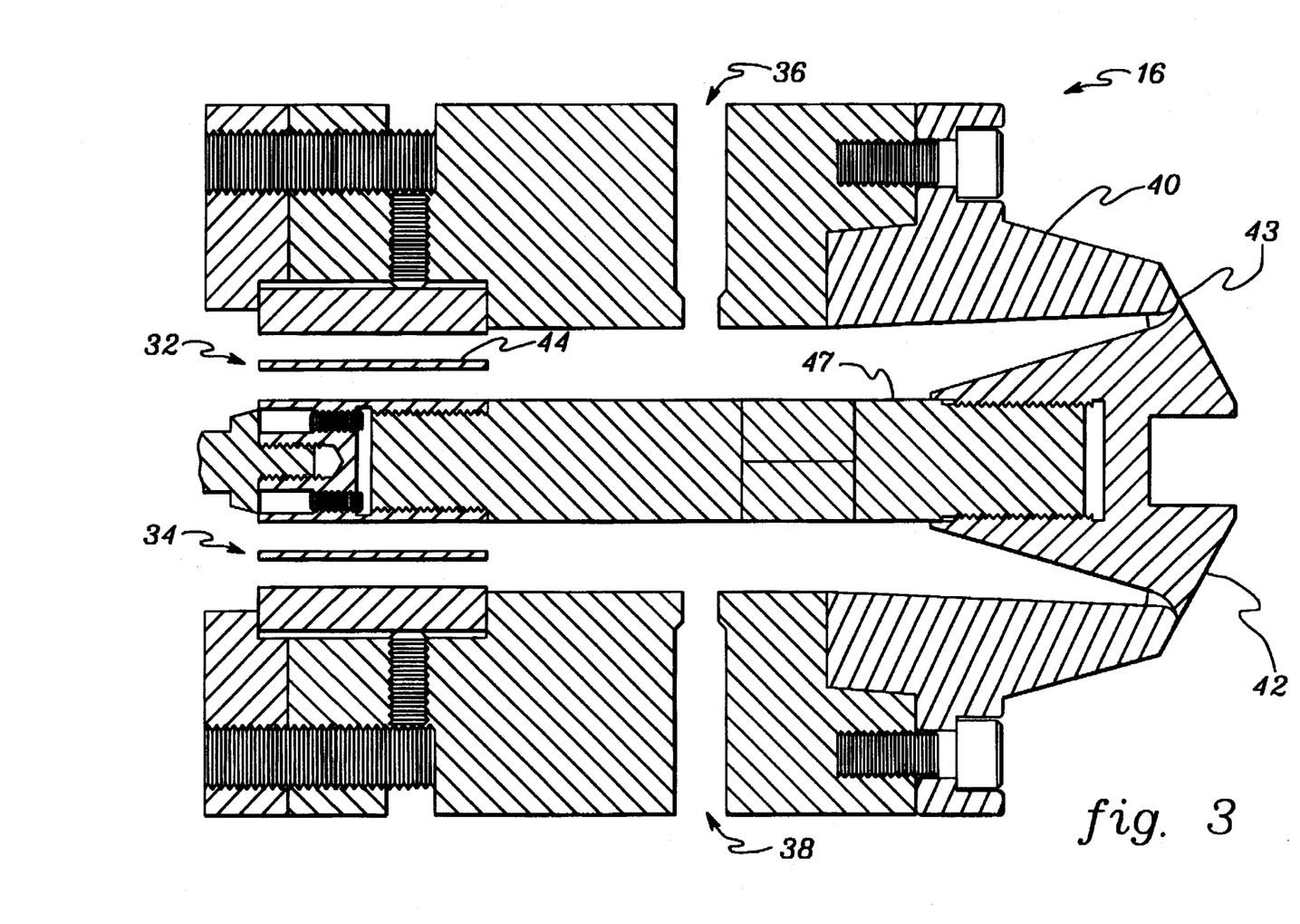
FIG. 3 is a cross-sectional view of the extrusion die of FIG. 1.

With reference to FIGS. 1–3, a general tandem extrusion process will now be described that is useful with the present invention. It will be understood, however, that other extrusion processes exist that could also be used, and this is merely one example given in order to put the invention in context.

FIG. 1 is a block diagram of the major portions 10 of machinery used in a tandem extrusion process. The major portions 10 include a primary extruder 12, secondary extruder 14 and die 16. One of ordinary skill in the art will understand the operation of the major portions. Generally, heating of the solids 13 to be extruded (a polymer) and mixing with the blowing agent 15 are accomplished in primary extruder 12. Cooling of the mixture is performed in secondary extruder 14. Finally, the cooled mixture is fed to die 16 for foaming.

FIG. 2 is a flow diagram for the extrusion process of FIG. 1. The raw materials are first fed to primary extruder 12 (STEP 20, "FEED RAW MATERIALS"). The raw materials will generally comprise a mixture of virgin polymer, reclaim polymer generated in manufacturing, colorants, stabilizers, nucleators, flame retardants, placticisers, and possibly other additives. Although ratios of the additives may vary greatly, generally the virgin polymer and reclaim polymer constitute about 90% or more of the solid feed by weight. The raw materials may be fed to primary extruder 12 by volumetric or gravimetric feeders and may or may not use a blender to homogenize the mixture before being fed. Often, the primary extruder is flood fed; that is, there is a constant supply of raw material directly on the extruder inlet or feed throat, although other types of feeding are practiced.

After the raw materials are fed to primary extruder 12, they are compressed and heated to melt them (STEP 22, "COMPRESS AND HEAT"). After melting the raw materials, the melt is pressurized (STEP 24, "PRESSURIZE MELT"). Typical pressures range from about 150 atm to about 350 atm. After pressurizing the melt, a blowing agent or agents (e.g., hydrocarbons, halohydrocarbons and/or inert gases) is injected into primary extruder 12. The pressure may temporarily be reduced to aid in the injection. The melted raw materials and blowing agent are then mixed to create a homogeneous mixture prior to exiting primary extruder 12 (STEP 26, "MIX WITH BLOWING AGENT"). The mixing could be, for example, distributive or dispersive.

After injecting the blowing agent and combining with the melted raw materials, the mixture is generally too hot to foam. When the mixture is too hot, viscosity is low, and if foaming were attempted, the blowing agent would expand the cells within the foam too rapidly, leading to cell wall rupture and foam collapse. If, on the other hand, the mixture were too cold, the blowing agent would have insufficient potential energy to expand the mixture into a foam. Precise control of the foaming temperature is thus needed to ensure good quality foam.

Cooling of the mixture is accomplished in secondary extruder 14 (STEP 28, "COOL MIXTURE"). The secondary extruder is usually larger than the primary extruder to maximize the amount of surface area for heat transfer. Shear heating of the mixture is minimized through various designs for the secondary extruder screw, which provides continuous surface renewal. Without this renewal, the mixture at the surface of the extruder barrel would freeze and insulate the rest of the mass, which would pass through the secondary extruder without being cooled. Usually, the extruder barrel in the secondary extruder operates at much lower revolutions than that of the primary extruder, to reduce shear heating. The particular screw design used may affect the pressure of the mixture.

The cooled mixture is then delivered to die 16 for foaming (STEP 30, "FOAM MIXTURE"). The principle purpose of the die is to shape the polymer into a form, while maintaining the pressure to ensure that the blowing agent does not separate from the mixture prematurely. Ideally, the blowing agent remains in the mixture until exiting the die. The design of the die determines the shape/thickness of the extruded foam. After the foam is extruded, any number of finishing equipment technologies may be used to produce the final product.

Figure 4:
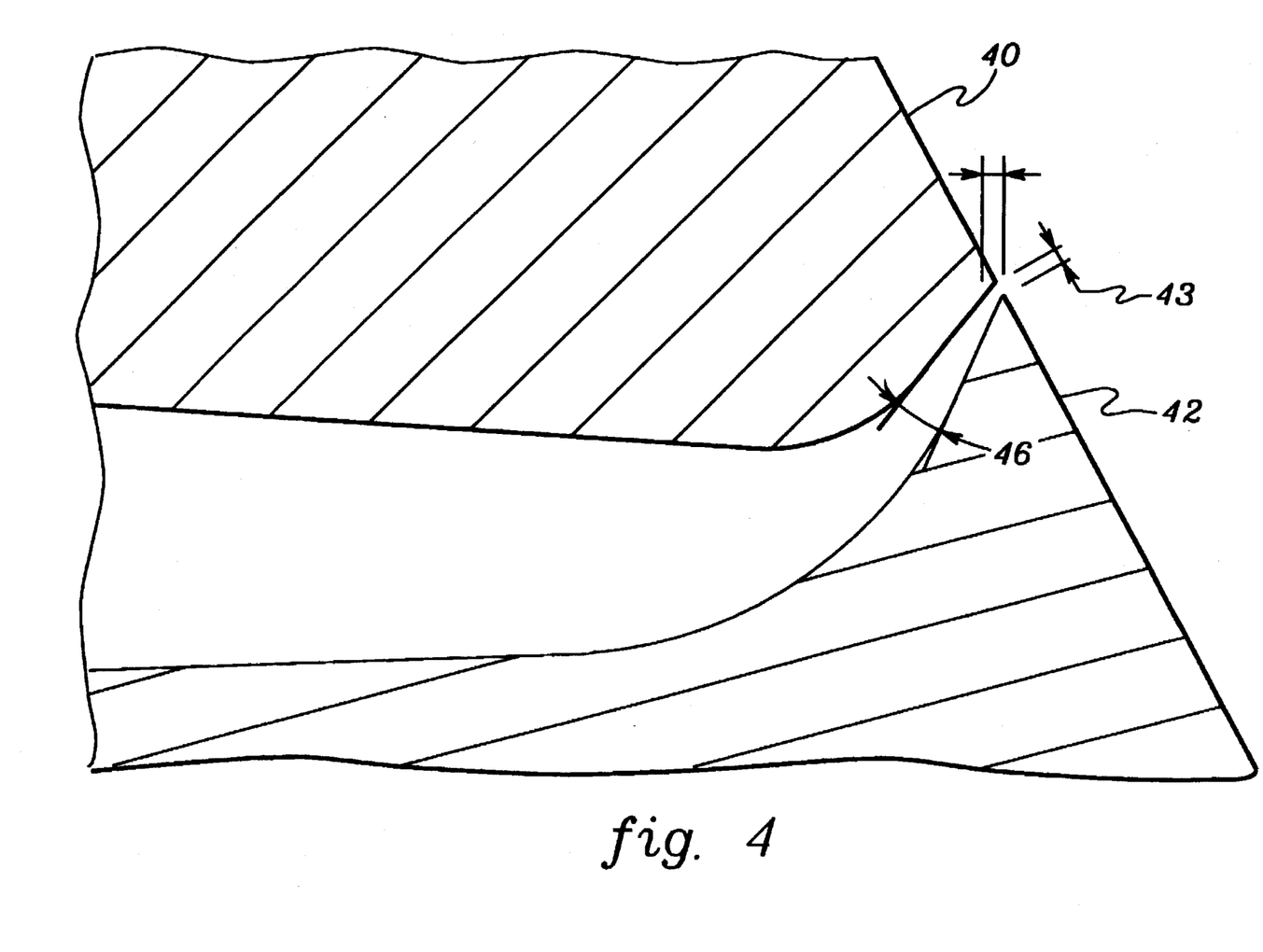
FIG. 4 depicts a blown-up portion of the die of FIG. 3.

FIG. 3 is a cross-sectional view of an exemplary embodiment of die 16. The cooled mixture enters die 16 through openings 32 and 34. The temperature and pressure of the mixture while inside the body of die 16 are monitored by instrumentation (not shown) connected at taps 36 and 38. The female die lip 40 and male die lip 42 define a die gap 43 (shown more clearly in FIG. 4. Spider or breaker plate section 44 holds male die lip 42 in place. Ideally, foaming takes place upon the polymer mixture exiting through die gap 40 and the blowing agent then vaporizing. However, foaming may begin in the land area 46 (called "prefoaming"). When prefoaming occurs, the result often is a less desirable surface finish and an irregular cell structure. To affect die pressure, the die gap may be increased or decreased through various mechanisms. One example of such a mechanisms is screw 47 in FIG. 3.

Producing good quality polystyrene foam by thermal extrusion requires that the blowing agent used remain in solution with the polystyrene resin upon entering the die land. As used herein, the term "good quality foam" refers to a substantially uniform closed cell foam with a surface that is substantially smooth to the touch. If the blowing agent comes out of solution prior to entering the land, pre-foaming occurs, resulting in a poor surface, nonuniform cells and a weak foam. Acceptable quality polystyrene foam is produced if the blowing agent comes out of solution after entering the land. However, good quality foam is produced if the blowing agent remains in solution until exiting the land. When this condition is satisfied, a clear "halo" of polystyrene can seen external to the die before foam growth has caused the material to become opaque. An operator of the extrusion machinery can use this halo as a visual indication that the die pressure is adequate and a good quality foam is most probably being produced.

The following variable relationships have been found useful in determining the conditions necessary to produce good quality polystyrene foam for a given blowing agent:

$$P_D \propto \frac{R * BAC * TM}{GAP * DR} \quad (1)$$

and $$P_D > P_{ES} \quad (2)$$

where $\alpha$ means "proportional to", * means "multiplied by", $P_D$ is the actual pressure at the die in atmospheres, R is the foam production rate in kg/hour, BAC is the blowing agent concentration expressed as a percentage of total solution weight, TM is the foaming temperature in °C., GAP is the die gap in mm, DR is the die radius in cm, and $P_{ES}$ is blowing agent equilibrium solubility pressure in psi. Typically, $P_D$ is greater than $P_{ES}$ by about 20 to 40 atm to produce good quality foam. Additional pressure may improve the surface quality and foam cell structure, but at the cost of reducing throughput. Although the viscosity of the polymer resin and type of additives (e.g., talc to improve nucleation) also affect die pressure, variables other than those in relationships (1) and (2) above are assumed to be fixed by product requirement (e.g., the need for a flame retardant), or can be compensated for. As an example, temperature can be varied to compensate for viscosity.

Several additional assumptions greatly simplify relationship (1) above. The production rate is generally maximized for a given production line. The die radius is determined by the desired blow-up ratio (i.e., the ratio of the circumference of the die to the final width of the extruded foam sheet). Generally, this ratio will result in the smallest die diameter that will still allow the extruded foam to be easily handled without an undue amount of corrugation. As one skilled in the art will know, the term "corrugation" describes foam extruded with alternating thick and thin areas, where the surface of the foam sheet can be characterized by a sine wave relationship. Finally, the lowest achievable melt temperature is generally used for a given production rate. Thus, based on a given production geometry, these variables become "fixed".

Based on these additional assumptions, relationship (1) reduces to:

$$P_D \propto \frac{BAC}{GAP} \quad (3)$$

The GAP varies, depending on the desired sheet thickness. Generally, a GAP of less than about 0.4 mm is undesirable, as dirt is more likely to inhibit extrusion and a foam thickness of greater than 10 times the GAP is generally difficult to achieve. Thus, 0.4 mm will be treated as the practical minimum die GAP. In addition, the BAC is determined by the desired density, as described more fully below. Therefore, for practical purposes, no degrees of freedom remain for a given blowing agent, and the blowing agent selected will either fall within a practical operating window for relationship (3) or it will not. Such a window 52 is shown in graph 50 of FIG. 5 for polystyrene at 373° K. and 411° K. for a typical density of 0.1 g/cm³.

Figure 5:
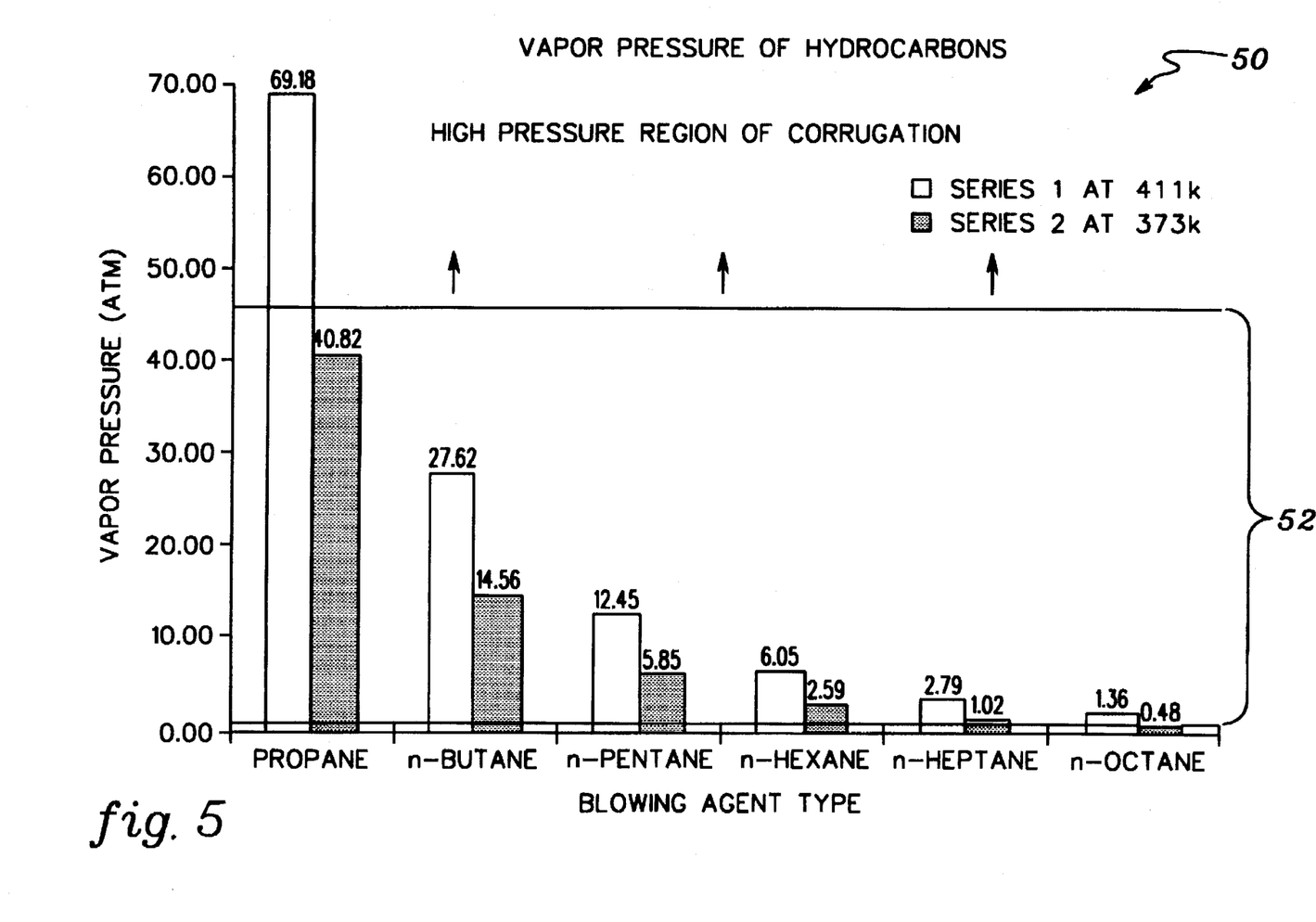
FIG. 5 is a graph of vapor pressure versus blowing agent type for typical polystyrene foaming temperatures.

Materials that meet the above parameters for use as a blowing agent for polystyrene include butanes, pentanes and hexanes. Although other materials also exist that could be used as blowing agents according to the above requirements, notably hydro-halocarbons, only alkanes will be discussed here to illustrate the point. As can be seen in FIG. 5, vapor pressures above approximately 45 atmospheres result in corrugation of the product yielding irregular strength and inferior appearance. Propane is expected to and does in fact result in product corrugation. A small amount of corrugation (about 10% thickness variation or less) is seen when using n-Butane. However, this corrugation can be "formed out" of the product during thermo-forming operations. Pressures corresponding to this slight amount of corrugation range form 25 to 45 atmospheres. At the other end of graph 50 are blowing agents that will not support the density of the product as the polystyrene mass cools and "freezes" at its glass transition temperature of approximately 373° K. As the internal cell gas pressure of n-Octane is less than 1 atmosphere at the glass transition temperature, collapse will occur. This is also true of n-Heptane to a degree, since equilibrium vapor pressure is somewhat less than ideal vapor pressure. (Some amount of the blowing agent is in solution with the polymer, thereby lowering the overall vapor pressure.) Theory and experiment agree as some amount of collapse is seen with n-Heptane. It can therefore be seen that n-Pentane represents a near prefect blowing agent for polystyrene using conventional foaming technology. No corrugation is expected and no collapse of the product is expected as the product cools. This is in fact what is seen in the real world, and Pentane is widely used as a blowing agent.

In the recent past, PET manufacturers have dedicated substantial resources to producing modified PET resins with melt strengths approaching that of polystyrene. Thus, it is a reasonable starting point to assume that relationships (1) and (2) above for polystyrene foam blowing agents will hold true for PET foam blowing agents as well.

As with polystyrene, the PET foam production rate is determined by the extrusion equipment used, power requirements, etc. Also, the blowing agent concentration is again set according to the desired density, and the die gap is set according to the desired PET foam thickness. The die blow-up ratio for PET foam is similar to, but slightly smaller than that for polystyrene, since PET foam has proven difficult to handle at blow-up ratios of over three-to-one. As one skilled in the art will know, the "blow-up ratio" refers to the circumference of the mandral determining the final width of the sheet compared to the circumference of the die. Polystyrene foam is generally produced at up to a four-to-one blow-up ratio at typical commercial densities. Finally, the melt temperature for PET is significantly different than that for polystyrene. Polystyrene is foamed at about 411° K., whereas PET is foamed at about 516° K. At this higher temperature, traditional blowing agents will cause severe corrugation and/or cell collapse, due to an increase in vapor pressure.

Corrugation results when the growth rate of the foam exceeds the physical geometric constraints of the system. For a given product, it is desired to obtain a given density and thickness. The density is controlled through the moles of gas added and the thickness is controlled through the pull or take-away speed. When producing foam, bubble formation initiates a three-dimensional growth. Since thickness is controlled and machine direction speed limited by rate, the only remaining dimension for growth is radial. In the manufacture of foam sheet, as indicated above, a blow-up ratio of 3 to 4 is typical. The sheet exits the die with a finite velocity and transitions from the die diameter to the mandrel diameter at a maximum angle of 90 degrees (45 to 70 degrees is common). If the rate of bubble growth increases the sheet circumference more quickly than the blow-up geometry allows, corrugation will occur. Corrugation can be described as a sine wave pattern during growth about a circular centerline. The result of this corrugation is that permanent lines are produced in the sheet in the machine direction corresponding to areas that are relatively thicker and thinner next to each other. The thinner areas when formed into a final product yield weak bands in the product. The result is poor product strength, heavier part weight to offset the poor strength, and poor appearance.

There are three major factors that determine corrugation: density, volatility of the blowing agent, and cell size. As the desired density decreases, the expansion ratio (density of the polymer melt divided by the density of the final foam) increases. Generally, product thickness requirements are set and the resulting increase in volumetric growth must be accommodated in the machine and radial directions. If the foam is to retain a relatively balanced cell structure, both must be increased by a power of 1.73 (i.e., the square root of 3). That is, since:

expansion ratio=k×(radial growth)×(thickness growth)× (machine direction growth), where k is a constant, if the expansion ratio is increased, but thickness is fixed, the equation becomes:

expansion ratio=k×(radial growth)$^{1.73}$×(machine direction growth)$^{1.73}$.

The exponents can be manipulated somewhat to attempt to reduce the radial growth, but it can be clearly seen that a reduction in density results in a higher radial growth rate, and, therefore, a greater possibility of corrugation.

The volatility of the blowing agent affects corrugation in that increased volatility results in more rapid cell growth. This often means that the final density of the product is reached or nearly reached before the product achieves the diameter of the mandrel, and, therefore, corrugation results. Low volatility blowing agents result in slow bubble growth and, therefore, no corrugation, but these gases may not contain the necessary potential energy to expand the foam to the desired density or may even become liquid during the expansion process, resulting in product collapse.

The cell size affects corrugation in the following way. The bubble growth rate is determined by the ability of the blowing agent to permeate to a nearby cell site and become gaseous. If more nucleant is used and the cells are smaller, the mean distance for the blowing agent to permeate to a cell is reduced. The result is faster cell growth and, again, a greater possibility of corrugation. It is theorized that as the cell size approaches zero and the number of cells approaches infinity, the growth rate of the foam approaches infinity, and the product will corrugate with any geometry.

As used herein, corrugation expressed as a percentage refers to the percentage difference between the maximum sheet thickness and minimum sheet thickness in adjoining bands or strips. In other words, it is the percent deviation about a local mean thickness. A level of up to 10% in corrugation can usually be tolerated, as the forming operation often will ultimately still yield a fairly uniform product.

Figure 6:
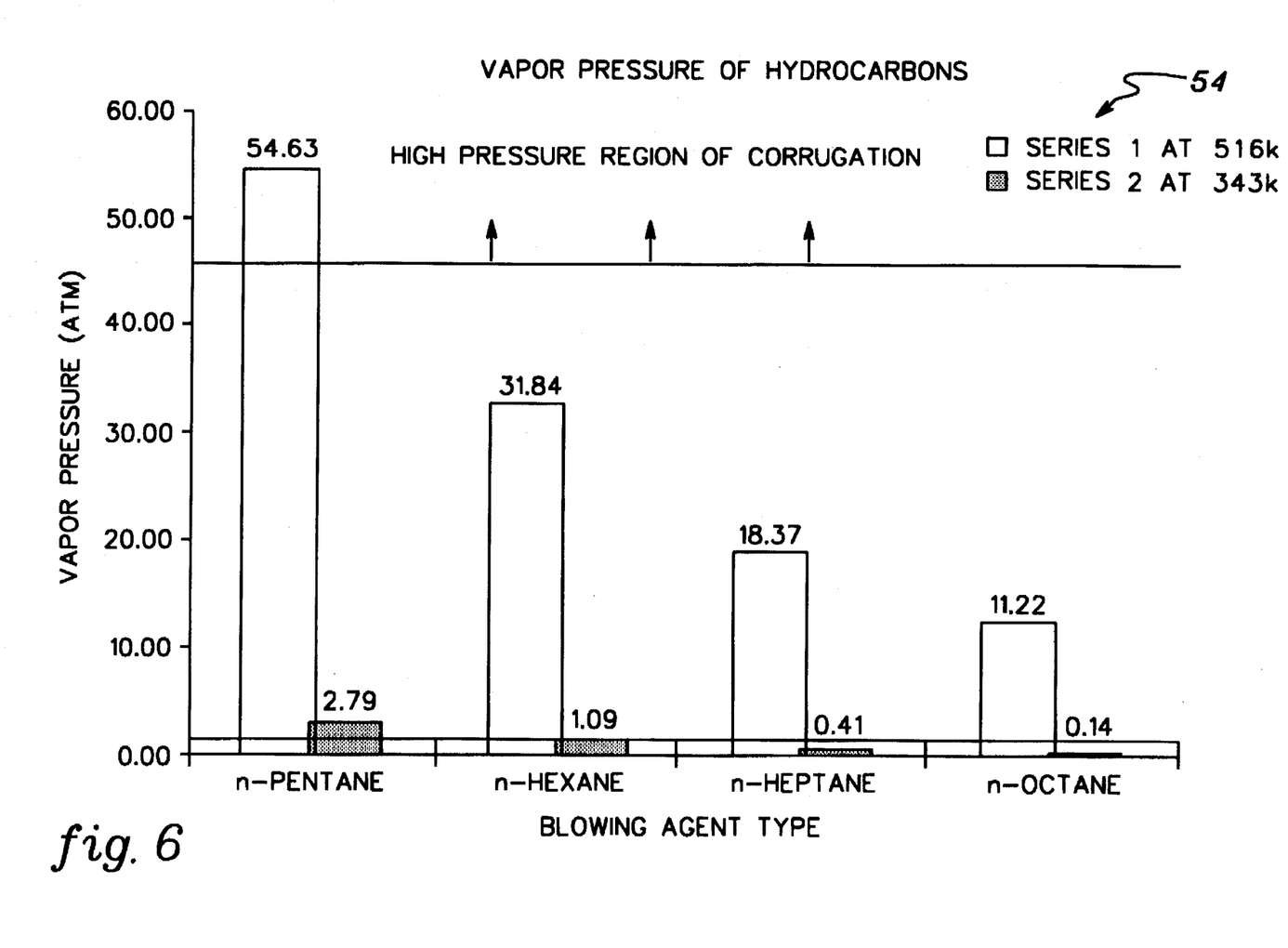
FIG. 6 is similar to FIG. 5, but at typical polyester foaming temperatures.

Since variables for PET other than melt temperature are similar to that for polystyrene, the blowing agents useful for PET should be those that exhibit vapor pressures at the PET foaming temperature similar to that exhibited by the traditional blowing agents at the polystyrene foaming temperature. Based on this simple premise, merely shifting the practical operating area in graph 50 of FIG. 5 to the right should result in blowing agent choices providing good quality PET foam. FIG. 6 graphs n-Pentane through n-Octane, similar to FIG. 5, at temperatures of 516° K. and 343° K. (the melt temperature at the die and glass transition temperature for PET, respectively) for a typical density of 0.1 g/cm$^3$. Note that the vapor pressures used to construct the graphs of FIGS. 5 and 6 were estimated using Antoine Equations as presented in *The Properties of Gases & Liquids*, 3d Ed., by Reid, Penusnitz and Sherwood, McGraw Hill, 1977, p. 629–665, which is hereby incorporated by reference.

Examination of FIG. 6 reveals, however, that simply shifting the graph toward higher molecular weight blowing agents is ineffective. Unlike polystyrene, there is a large temperature difference between the foaming temperature, which must be above the crystalline melt temperature, and the glass transition temperature. (To form product, the extruded sheet is quenched using a chilled roll or mandrel. This results in an amorphous sheet, but also allows for molecular movement down to the glass transition temperature of about 343° K.) Graph 54 suggests that n-Pentane will cause excessive corrugation, while some collapse of the foam will occur when using n-Heptane. Both of these suggestions have been experimentally verified. Unexpectedly, however, on several occassions, foam produced using n-Heptane did not collapse as might be expected based on the vapor pressure data. Initially, these results were attributed to experimental error, but when the experiments were repeated, the results proved reproducible. In fact, as shown in the Examples below, good quality, low density foam was produced with minimal corrugation.

From FIG. 6, no corrugation is expected when using n-Heptane as the sole blowing agent, however, the foam is expected to collapse, losing between 50% and 60% of its expected density. To illustrate, the theoretical density calculated for examples 3 and 4 are 0.11 g/cm$^3$ and 0.25 g/cm$^3$, respectively. Allowing for some loss of efficiency due to permeation and solubility effects, an expected density for these materials based on the amount of gas used would be 0.12 and 0.27 g/cm$^3$, respectively. However, due to the low vapor pressure of n-Heptane at the glass transition temperature, these two samples should have exhibited a final density of 0.28 g/cm$^3$ for Example 3 and 0.63 g/cm$^3$ for Example 4. In fact, the actual sample densities for Examples 3 and 4 were 0.13 g/cm$^3$ and 0.29 g/cm$^3$, respectively. Thus, it can be seen that the gas efficiency in these samples is quite acceptable and produced good quality foam at the low density.

The discrepancy between the expected densities and the unexpectedly low actual densities, can be explained as follows. The melting point of polyester is known to be in excess of 500° K., while its glass transition temperature is only 343° K. The melt point is determined by the degree of crystallinity of the polyester, since the energy required to dissassociate the molecules is substantially higher in the crystalline phase. A fully crystallized polyester molecule has approximately 33% of its mass in crystalline form, while the remainder is amorphous. The melt point for such a material is about 520° K. It can be seen that, depending on the level of crystallinity, the melting point of this polyester can range from 343° K. to 520° K.

To produce a formed product, it is well known that PET must be quenched when extruded to freeze the material in the amorphous state. The sheet is then crystallized in the forming operation using a heated tool to facilitate crystal growth. Failure to do so results in sheet material that will not stretch and consequently will not form. In fact, the sheet when quenched is not 100% amorphous, but typically shows levels of a few percent crystallinity. This small amount of crystallinity can generally be tolerated and does not adversely affect the forming operation or the final product.

Analysis of the Examples herein indicated a crystallinity level in the foam sheet ranging from about 8% to as high as 15%. Surprisingly, even at a level of 15% crystallinity, the product could still be formed relatively easily. This may be due to the thin cell walls being more easily deformed without breaking. Despite the use of a cold mandrel, the high levels of crystallinity are explainable. Since foam is insulative in nature, the effect of the cooling can is only a surface phenomenon and the body of the foam cools more slowly, supporting the crystal growth.

The level of crystallinity in the Examples herein indicates that, through approximation by linear extrapolation, the freeze point of the polyester was not 343° K., the glass transition temperature, but actually in the range of 385° K. to 423° K. In the worst case of the lower temperature, the vapor pressure of n-Heptane is about 1.4 atmospheres. This vapor pressure at the freeze point is sufficient to prevent collapse of the cell and therefore presents a reasonable technical explanation for the experimental results.

From FIG. 6, it can be seen that n-Hexane satisfies the selection criteria previously discussed. Although through careful control of operating parameters, n-Hexane can be used successfully to produce low density PET foam, its toxicity makes it unsuitable for many commercial uses, such as high temperature food containers. However, Heptane has been approved by the U.S. Food and Drug Administration for use in making food containers, including high temperature food containers.

The present invention provides a method for extruding good quality, low density polyester foam using Heptane as the blowing agent. The term "low-density" used in this context refers to an extruded polyester foam of a density less than about 0.40 g/cm$^3$. A polyester resin is first heated to the foaming temperature, which depends on the resin used, but is above its crystalline melt point (about 543° K.). Heptane, as the blowing agent, is then combined with the polyester resin. As used herein, the term "polyester resin" refers to a polyester resin with an intrinsic viscosity of more than about 0.8 dl/g.

The blowing agent comprises about 0.5% to about 5% by weight of the blowing agent/polyester resin mixture. Preferably, the Heptane comprises about 1% to about 3% by weight of the mixture. The mixture is then cooled to a temperature of less than 538° K., and preferably less than 528° K. The cooled mixture is then extruded through the die. For good quality foam, the blowing agent should stay in solution with the resin until at least until entering the die land, and preferably until exiting the die land.

Example data will now be presented. Examples 1, 2 and 4 used a commercially available polyester resin, Shell 10480, sold by the Shell Corporation, while the third example used a commercially available polyester resin "X295" from E. I. du Pont de Nemours & Company. Both of these resins have intrinsic viscosities greater that 0.8 dl/g and are considered to be "foam grade" by their respective manufacturers. However, it will be understood that other polyester resins could be used.

EXAMPLE 1

This example (see Table I below) illustrates one of the two major problems associated with conventional blowing agents. At a level of 1% iso-pentane, which yields a relatively high density of 0.23 g/cm$^3$, unacceptable levels of corrugation were produced. Compared to the average thickness of 1.08 mm, the thickness of the sheet at the high and low points varied plus and minus 20%. This variation in thickness or corrugation caused weak bands to be formed into the product and resulted in an unacceptable product quality. (Although somewhat arbitrary, corrugation levels of up to 10% are generally considered acceptable. The forming operation can successfully remove such a level of corrugation without deleterious effects to the final product.) Note that at this density, the efficiency of the blowing agent is quite high. The measured foam density was 96% of the theoretical density attainable, based on the mass of material extruded and the amount of blowing agent added.

The theoretical density was calculated based on the ideal gas law. The mass of the solid additives was converted to a volume based upon specific gravity. This amount of volume was added to the gaseous volume and divided into the extruded mass to yield a density. To determine the gaseous volume, the ideal gas law was used. The blowing agent weight added was converted to moles. By the ideal gas law, each mole yields 22.4 liters of volume at 1 atm and 298° K. The gas in the expanding mass can be assumed to expand until internal and external pressures reach equilibrium. The polyester only expands until reaching the glass transition temperature of about 343° K., at which time the foam became "frozen" and no further movement of the polyester molecules occurred. Using the elevated temperature of 343° K., a further reduction of 15% in the density is attainable due to the additional expansion of a gaseous mole to 25.8 liters. Again, this volume is based on the ideal gas law. Assumptions in this model include: the ideal gas law is applicable (this is a good assumption as pressures were low and the gases were not critical), and the residual solubility of the blowing agent in the polymer at the glass transition temperature is small (based on temperature and pressure solubility data, this is also considered a valid assumption).

TABLE I

| Temperatures | |
| --- | --- |
| 2.5" Cooling Extruder | 254° C. |
| Die Temperature | 267° C. |
| Die Lip | 253° C. |
| Crossover Melt | 282° C. |
| Die Melt | 254° C. |
| Pressures | |
| Injection Pressure | 183.9 atm |
| 2" Pressure | 233.3 atm |
| Crossover Pressure | 191.2 atm |
| Die Pressure | 41.5 atm |

TABLE I-continued

| Drive Conditions | |
| --- | --- |
| 2" AMP | 34 amps |
| 2" Speed | 70 rpm |
| 2.5" AMP | 14 amps |
| 2.5" Speed | 16.5 rpm |
| Formulation | |
| Polymer Type | Shell 10480 |
| Polymer Rate | 29.2 kg/hr |
| Nucleator Type | Shell 10485 |
| Nucleator Rate | 0.36 kg/hr |
| Blowing Agent Type | i-Pentane |
| Blowing Agent Rate | 0.30 kg/hr |
| Test Data | |
| Density | 0.23 g/cm$^3$ |
| Theoretical Density | 0.22 g/cm$^3$ |
| Average Thickness | 1.08 mm |
| Corrugation | 20% |
| Cell Size | 0.18 mm |

EXAMPLE 2

This example (see Table II below) illustrates the problem of collapse associated with conventional blowing agents used in an effort to make polyester foam. In this case, the amount of gas was increased to a level yielding a theoretical density of 0.11 g/cm$^3$. Due to the high vapor pressure and concentration of the gas at the foaming temperature, the growth rate of the foam exceeded the melt strength of the polymer. The result was open cell foam and complete collapse.

TABLE II

| Temperatures | |
| --- | --- |
| 2.5" Cooling Extruder (Average) | 252° C. |
| Die Temperature | 258° C. |
| Die Lip | 259° C. |
| Crossover Melt | 276° C. |
| Die Melt | 252° C. |
| Pressures | |
| Injection Pressure | 170.1 atm |
| 2" Pressure | 195.9 atm |
| Crossover Pressure | 174.2 atm |
| Die Pressure | 48.3 atm |
| Drive Conditions | |
| 2" AMP | 35 amps |
| 2" Speed | 80 rpm |
| 2.5" AMP | 10 amps |
| 2.5" Speed | 17.0 rpm |
| Formulation | |
| Polymer Type | Shell 10480 |
| Polymer Rate | 33.4 kg/hr |
| Nucleator Type | Shell 10485 |
| Nucleator Rate | 0.24 kg/hr |
| Blowing Agent Type | i-Pentane |
| Blowing Agent Rate | 0.76 kg/hr |
| Test Data | |
| Density | >1.0 g/cm$^3$ |
| Theoretical Density | 0.11 g/cm$^3$ |
| Average Thickness | NA |
| Corrugation | NA |
| Cell Size | NA |

EXAMPLE 3

This example (see Table III below) illustrates the utility of n-Heptane as a blowing agent for production of low density polyester foam sheet. The sample data shows that a low density polyester foam sheet can be achieved with good blowing agent efficiency and minimal corrugation. In this example, the density of the sheet was 0.13 g/cm³ at a blowing agent efficiency of 85%. Corrugation was minimal at 6% total deviation about the average thickness. The sheet produced was successfully thermoformed into a useful packaging article; in this case, a meat tray.

An additional advantage of using n-Heptane as a blowing agent for polyester resin is that the operating conditions listed below are typical for a common tandem foam extrusion line. No expensive modifications, such as improved mixing secitons or high pressure equipment are needed.

TABLE III

| Temperatures | |
|---|---|
| 2.5" Cooling Extruder (Average) | 243° C. |
| Die Temperature | 253° C. |
| Die Lip | 254° C. |
| Crossover Melt | 279° C. |
| Die Melt (Estimate) | 255° C. |
| Pressures | |
| Injection Pressure | 143 atm |
| 2" Pressure | 312 atm |
| Crossover Pressure | 144 atm |
| Die Pressure | 54 atm |
| Drive Conditions | |
| 2" AMP | 32 amps |
| 2" Speed | 70 rpm |
| 2.5" AMP | 12 amps |
| 2.5" Speed | 17.6 rpm |
| Formulation | |
| Polymer Type | DuPont X295 |
| Polymer Rate | 29.7 kg/hr |
| Nucleator Type | Talc |
| Nucleator Rate | 0.18 kg/hr |
| Blowing Agent Type | n-Heptane |
| Blowing Agent Rate | 0.91 kg/hr |
| Test Data | |
| Density | 0.13 g/cm³ |
| Theoretical Density | 0.11 g/cm³ |
| Average Thickness | 2.66 mm |
| Corrugation | 6% |
| Cell Size | 0.22 mm |

EXAMPLE 4

This example (see Table IV below) further illustrates the utility of n-Heptane as a blowing agent for low density polyester foam. In this example, a somewhat higher density sheet was produced. Again, however, the blowing agent efficiency was quite high at 85%, and again corrugation was at an acceptable level of no more than 8%. Also again, a useful product was thermoformed from the polyester foam sheet produced.

TABLE IV

| Temperatures | |
|---|---|
| 2.5" Cooling Extruder (Average) | 254° C. |
| Die Temperature | 267° C. |
| Die Lip | 264° C. |
| Crossover Melt | 280° C. |
| Die Melt (Estimate) | 260° C. |

TABLE IV-continued

| Pressures | |
|---|---|
| Injection Pressure | 218 atm |
| 2" Pressure | 215 atm |
| Crossover Pressure | 218 atm |
| Die Pressure | 67 atm |
| Drive Conditions | |
| 2" AMP | 34 amps |
| 2" Speed | 90 rpm |
| 2.5" AMP | 11 amps |
| 2.5" Speed | 17.5 rpm |
| Formulation | |
| Polymer Type | Shell 10485 |
| Polymer Rate | 33.6 kg/hr |
| Nucleator Type | Shell 10480 |
| Nucleator Rate | 0.48 kg/hr |
| Blowing Agent Type | n-Heptane |
| Blowing Agent Rate | 0.59 kg/hr |
| Test Data | |
| Density | 0.29 g/cm³ |
| Theoretical Density | 0.25 g/cm³ |
| Average Thickness | 1.34 mm |
| Corrugation | 8% |
| Cell Size | 0.13 mm |

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

I claim:

1. A method for producing a substantially uniform closed cell foam of density less than about 0.40 g/cm³ from a polyester resin with an intrinsic viscosity of more than about 0.8 dl/g by extrusion through a die at a foaming temperature, comprising steps of:

heating the polyester resin to a temperature such that the polyester resin melts;

combining Heptane as a blowing agent with the polyester resin to create a mixture;

cooling the mixture to a temperature of less than 538° K.; and extruding the substantially uniform closed cell foam of density less than about 0.40 g/cm³ from the die.

2. The method of claim 1 wherein the blowing agent comprises about 0.5% to about 5% by weight of the mixture.

3. The method of claim 2, wherein the blowing agent comprises about 1% to about 3% by weight of the mixture.

4. The method of claim 1 wherein the density of the substantially uniform closed cell foam is in a range from 0.02 g/cm³ to less than 0.40 g/cm³.

5. The method of claim 1 wherein the polyester resin comprises one or more additives.

6. The method of claim 5 wherein the one or more additives comprise one or more of a cell size nucleation agent, a flame retardant, a colorant and a plasticizer.

7. The method of claim 1 wherein the substantially uniform closed cell foam has corrugation equal to or less than 10%.

* * * * *

UNITED STATES PATENT AND TRADEMARK OFFICE
CERTIFICATE OF CORRECTION

PATENT NO. : 5,681,865
DATED : Oct. 28, 1997
INVENTOR(S) : Harfmann

It is certified that error appears in the above-identified patent and that said Letters Patent are hereby corrected as shown below:

Col. 9, Table I, Line 63 "Injection Pressure  183.9 atm"
   should read –Injection Pressure  183.7 atm--

Signed and Sealed this

Fifth Day of May, 1998

Attest:

BRUCE LEHMAN

*Attesting Officer*      *Commissioner of Patents and Trademarks*